United States Patent
Moon et al.

(10) Patent No.: US 10,351,010 B2
(45) Date of Patent: Jul. 16, 2019

(54) BATTERY SYSTEM FOR VEHICLE

(71) Applicants: Hyundai Motor Company, Seoul (KR); Kia Motors Corporation, Seoul (KR)

(72) Inventors: Hyo Sik Moon, Gyeonggi-Do (KR); Kyung In Min, Gyeonggi-do (KR); Yu Seok Kim, Seoul (KR); Suk Hyung Kim, Gyeonggi-Do (KR); Jae Hoon Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/829,930

(22) Filed: Dec. 3, 2017

(65) Prior Publication Data
US 2019/0111801 A1  Apr. 18, 2019

(30) Foreign Application Priority Data
Oct. 18, 2017 (KR) .......... 10-2017-0135090

(51) Int. Cl.
*H02P 7/298* (2016.01)
*H02P 27/06* (2006.01)
(Continued)

(52) U.S. Cl.
CPC ........ *B60L 11/1868* (2013.01); *B60L 11/1803* (2013.01); *H02J 7/0019* (2013.01); *H02P 27/06* (2013.01)

(58) Field of Classification Search
CPC .................................................. H02P 27/00
(Continued)

(56) References Cited

U.S. PATENT DOCUMENTS 3,836,788 A * 9/1974 Carlson ............... H02P 7/18
290/37 R
3,984,744 A * 10/1976 Moody ............... H02P 7/285
318/442
(Continued)

FOREIGN PATENT DOCUMENTS

DE  10053169 A1  6/2001
DE  10220939 A1  11/2002
(Continued)

OTHER PUBLICATIONS

Extended European Search Report for European Patent Application No. 17205583.2, dated May 23, 2018, 15 pages.

*Primary Examiner* — Bentsu Ro
(74) *Attorney, Agent, or Firm* — Mintz Levin Cohn Ferris Glovsky and Popeo, P.C.; Peter F. Corless

(57) ABSTRACT

A battery system for a vehicle includes: a battery assembly including at least one first battery module and at least one second battery module; a first relay being closed/opened between a first node and one of a first end of the first battery module and a first end of the second battery module being connected to a second end of the first battery module; a second relay being closed/opened between a second node and a second end of the second battery module; a converter converting a voltage between the nodes; a third relay being closed/opened between the converter and the first end of the first battery module; a fourth relay being closed/opened between the first end of the first battery module and a ground; and a battery manager controlling the relays based on a driving condition of the vehicle and energy storage amounts of the modules.

28 Claims, 7 Drawing Sheets

(51) Int. Cl.
*B60L 11/18* (2006.01)
*H02J 7/00* (2006.01)

(58) Field of Classification Search
USPC .................................................. 318/500, 504
See application file for complete search history.

(56) References Cited

U.S. PATENT DOCUMENTS

| | | | |
|---|---|---|---|
| 5,225,761 A * | 7/1993 | Albright | ............... H02J 7/1423 |
| | | | 320/117 |
| 6,323,608 B1 | 11/2001 | Ozawa | |
| 6,909,201 B2 | 6/2005 | Murty et al. | |
| 2004/0130214 A1 | 7/2004 | Murty et al. | |
| 2008/0061764 A1* | 3/2008 | Tae | ....................... B60L 3/0038 |
| | | | 324/72 |
| 2012/0007551 A1* | 1/2012 | Song | ................... B60L 11/1814 |
| | | | 320/109 |
| 2017/0001526 A1 | 1/2017 | Kawaguchi et al. | |

FOREIGN PATENT DOCUMENTS

| | | |
|---|---|---|
| DE | 102010047685 A1 | 6/2011 |
| DE | 102012220549 A1 | 5/2014 |
| DE | 102014201362 A1 | 7/2015 |
| DE | 102014010183 A1 | 11/2015 |
| DE | 102014208117 A1 | 11/2015 |
| EP | 2053717 A2 | 4/2009 |
| EP | 2426005 A2 | 3/2012 |
| EP | 2587618 A2 | 5/2013 |
| JP | 4952229 B2 | 6/2012 |
| KR | 10-2012-0062956 | 6/2012 |
| KR | 10-2017-0021055 | 2/2017 |

\* cited by examiner

BATTERY SYSTEM FOR VEHICLE

CROSS REFERENCE TO RELATED APPLICATION

The present application claims under 35 U.S.C. § 119(a) the benefit of Korean Patent Application No. 10-2017-0135090, filed Oct. 18, 2017, the entire contents of which are incorporated by reference herein.

BACKGROUND (a) Technical Field

The present disclosure relates to a battery system for a vehicle, more particularly, to a high voltage-low voltage integrated battery system integrating a high voltage battery system used to provide driving power with a low voltage battery system for providing power to an electronic load, etc. of the vehicle.

(b) Description of the Related Art

Generally, an eco-friendly vehicle (such as a hybrid vehicle, electronic vehicle, fuel cell vehicle, etc.) having an electric motor for providing driving power to the wheels has a high voltage battery to provide energy of high voltage for the electric motor. In particular, high voltage means a voltage relatively higher than a voltage (generally, a range of 11 to 14 V) of a battery provided for starting an engine-driven vehicle or for supplying power to electronic loads.

Therefore, the eco-friendly vehicle generally has a high voltage battery for operating the electric motor and a low voltage battery for power supply to electronic loads separately. Managing individual power systems for separate high and low voltage batteries results in systems of enlarged size, and thus reduced efficiency.

To address this problem, utilizing a single battery assembly composed of several cells or modules, a conventional high voltage-low voltage integrated system in which parts of several battery modules that make up a high voltage battery are used for low-voltage power supply has been proposed.

However, the conventional high voltage-low voltage integrated system is problematic in that there is an imbalance in states of charge between several modules included in the single battery assembly, and thus efficiency or robustness of the system is degraded and operation becomes unstable.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a battery system for a vehicle that properly performs battery state control for each condition of a vehicle such that parts of several battery modules that make up a high voltage battery can be stably and effectively used for a low voltage system, whereby a high voltage system and a low voltage system can be managed in an integrated manner.

In order to achieve the above object, according to one aspect of the present disclosure, there is provided a battery system for a vehicle, the system including: a battery assembly including at least one first battery module and at least one second battery module that are connected to each other in series; a first relay being closed/opened between a first node and one of a first end of the first battery module and a first end of the second battery module being connected to a second end of the first battery module; a second relay being closed/opened between a second node and a second end of the second battery module; a converter converting a voltage between the first node and the second node to output the converted voltage; a third relay being closed/opened between an output end of the converter and the first end of the first battery module; a fourth relay being closed/opened between the first end of the first battery module and a ground; and a battery manager controlling the first to fourth relays based on a driving condition of the vehicle and energy storage amounts of the first battery module and the second battery module.

In an embodiment of the present disclosure, the first and second nodes may be connected to an input end of an inverter converting direct current power to alternating current power of the battery assembly to provide the alternating current power to a driving motor of the vehicle.

In an embodiment of the present disclosure, the first and second nodes may receive charging power for charging the first battery module and the second battery module.

In an embodiment of the present disclosure, the output end of the converter may be connected to a power input end of an electronic component of the vehicle.

In an embodiment of the present disclosure, a capacity of the first battery module may be larger than a capacity of the second battery module.

In an embodiment of the present disclosure, in a case of a key-off state of the vehicle, when a value obtained by subtracting the energy storage amount of the second battery module from the energy storage amount of the first battery module is less than zero, the battery manager may control the first relay to connect the first node to the first end of the second battery module, may control the second relay to connect the second node to the second end of the second battery module, and may control the third and fourth relays to be closed, and the battery manager may operate the converter to charge the first battery module by using energy stored in the second battery module such that the energy storage amount of the first battery module reaches a preset reference value.

In an embodiment of the present disclosure, in a case of a key-off state of the vehicle, when a value obtained by subtracting the energy storage amount of the second battery module from the energy storage amount of the first battery module exceeds a preset reference value, the battery manager may discharge the first battery module such that the energy storage amount of the first battery module reaches the preset reference value.

In an embodiment of the present disclosure, the battery manager may discharge the first battery module by performing passive balancing thereon such that the energy storage amount of the first battery module reaches the preset reference value.

In an embodiment of the present disclosure, in a case of a key-off state of the vehicle, when a value obtained by subtracting the energy storage amount of the second battery module from the energy storage amount of the first battery module is equal to a preset reference value, the battery manager may control the first and second relays such that the first and second nodes are in a floating state, and may control the third and fourth relays to be closed, and after the controlling the third and fourth relays to be closed, when the energy storage amount of the first battery module is equal to or less than a preset threshold value, the battery manager may control the third and fourth relays to be opened.

In an embodiment of the present disclosure, after ignition-on of the vehicle, when a value obtained by subtracting the energy storage amount of the second battery module from the energy storage amount of the first battery module is equal to or greater than zero and is equal to or less than a preset reference value, the battery manager may control the first relay to connect the first node to the first end of the first battery module, may control the second relay to connect the second node to the second end of the second battery module, and may control the third and fourth relays to be opened.

In an embodiment of the present disclosure, after ignition-on of the vehicle, when a value obtained by subtracting the energy storage amount of the second battery module from the energy storage amount of the first battery module exceeds a preset reference value, the battery manager may discharge the first battery module such that the energy storage amount of the first battery module reaches the preset reference value.

In an embodiment of the present disclosure, the battery manager may discharge the first battery module by performing passive balancing thereon such that the energy storage amount of the first battery module reaches the preset reference value.

In an embodiment of the present disclosure, when the vehicle is running during discharging of the first battery module, the battery manager may control the first relay to connect the first node to the first end of the second battery module and may control the second relay to connect the second node to the second end of the second battery module until the first battery module is discharged to the preset reference value, whereby energy stored in the second battery module is provided to a driving motor of the vehicle.

In an embodiment of the present disclosure, after ignition-on of the vehicle, when a value obtained by subtracting the energy storage amount of the second battery module from the energy storage amount of the first battery module is less than zero, the battery manager may control the first relay to connect the first node to the first end of the second battery module and may control the second relay to connect the second node to the second end of the second battery module, whereby energy stored in the second battery module is provided to a driving motor of the vehicle.

In an embodiment of the present disclosure, when charging power is supplied from outside through the first node and the second node, the battery manager may control the first relay to connect the first node to the first end of the second battery module, may control the second relay to connect the second node to the second end of the second battery module, and may control the third and fourth relays to be closed, and the battery manager may operate the converter to charge the first battery module by using energy stored in the second battery module.

In an embodiment of the present disclosure, the system may further include a fifth relay being closed/opened between the second end of the first battery module and the first end of the second battery module, wherein when the first relay is closed between the first node and the first end of the first battery module, the battery manager may close the fifth relay, and when the second relay is closed between the second node and the first end of the second battery module or the second node is in floating state, the battery manager may open the fifth relay.

In an embodiment of the present disclosure, the preset reference value may be a value obtained by subtracting the capacity of the second battery module from the capacity of the first battery module.

According to another aspect, there is provided a battery system for a vehicle, the system including: a battery assembly including at least one first battery module and at least one second battery module that have different capacities from each other; an input/output end to which energy of the first battery module or energy that is a sum of the energy of the first battery module and energy of the second battery module is selectively applied; a converter converting a voltage of energy of the battery assembly being applied to the input/output end and selectively providing the converted voltage to the first battery module; and a battery manager determining an electrical connection between the battery assembly and the input/output end and an electrical connection between the converter and the first battery module based on a driving condition of the vehicle and energy storage amounts of the first battery module and the second battery module.

In an embodiment of the present disclosure, the battery manager may determine the electrical connection between the battery assembly and the input/output end and the electrical connection between the converter and the first battery module such that a value obtained by subtracting the energy storage amount of the second battery module from the energy storage amount of the first battery module is in a preset reference rang.

According to still another aspect, there is provided a battery system for a vehicle, the system including: a battery assembly including at least one first battery module and at least one second battery module that are connected to each other in series; a first relay being closed/opened between a first end of the battery assembly and a first node; a second relay being closed/opened between a second end of the battery assembly and a second node; a converter converting a voltage between the first node and the second node to output the converted voltage; a third relay being closed/opened between an output end of the converter and a first end of the first battery module; a fourth relay being closed/opened between the first end of the first battery module and a ground; and a battery manager controlling the first to fourth relays based on a driving condition of the vehicle and energy storage amounts of the first battery module and the second battery module.

In an embodiment of the present disclosure, a capacity of the first battery module may be larger than a capacity of the second battery module.

In an embodiment of the present disclosure, in a case of a key-off state of the vehicle, when a value obtained by subtracting the energy storage amount of the second battery module from the energy storage amount of the first battery module is less than zero, the battery manager may control the first to fourth relays to be closed, and may operate the converter to charge the first battery module by using energy stored in the battery assembly such that the energy storage amount of the first battery module reaches a preset reference value.

In an embodiment of the present disclosure, in a case of a key-off state of the vehicle, when a value obtained by subtracting the energy storage amount of the second battery module from the energy storage amount of the first battery module exceeds a preset reference value, the battery manager may discharge the first battery module by performing passive balancing thereon such that the energy storage amount of the first battery module reaches the preset reference value.

In an embodiment of the present disclosure, in a case of a key-off state of the vehicle, when a value obtained by subtracting the energy storage amount of the second battery module from the energy storage amount of the first battery module is equal to a preset reference value, the battery manager may control the first and second relays to be opened and controls the third and fourth relays to be closed, and after the controlling the third and fourth relays to be closed, when the energy storage amount of the first battery module is equal to or less than a preset threshold value, the battery manager may control the third and fourth relays to be opened.

In an embodiment of the present disclosure, after ignition-on of the vehicle, when a value obtained by subtracting the energy storage amount of the second battery module from the energy storage amount of the first battery module is equal to or greater than zero and is equal to or less than a preset reference value, the battery manager may control the first and second relays to be closed and controls the third and fourth relays to be opened.

In an embodiment of the present disclosure, after ignition-on of the vehicle, when a value obtained by subtracting the energy storage amount of the second battery module from the energy storage amount of the first battery module exceeds a preset reference value, the battery manager may discharge the first battery module by performing passive balancing thereon such that the energy storage amount of the first battery module reaches the preset reference value. In an embodiment of the present disclosure, when charging power is supplied from outside through the first node and the second node, the battery manager may control the first to fourth relays to be closed, and may operate the converter to charge the first battery module by using energy stored in the battery assembly.

In an embodiment of the present disclosure, the preset reference value may be a value obtained by subtracting the capacity of the second battery module from the capacity of the first battery module.

According to the battery system for the vehicle, parts of several battery modules that make up one battery assembly used in a high voltage system of the vehicle can be used for a low voltage system. Also, a capacity of the battery module used for low voltage is significantly larger than a capacity of each of the remaining battery modules, and a battery module used for high-voltage power is determined based on a driving state of a vehicle and a deviation of energy storage amounts between the low voltage battery module and the remaining battery modules, whereby it is possible to solve problems such as balancing required to use some modules of the battery assembly for low voltage.

According to the battery system for the vehicle, a separate low voltage battery is unnecessary such that a space required thereby in the vehicle is unneeded, whereby it is easy to manufacture the battery system and manufacturing costs can be reduced.

Also, according to the battery system for the vehicle, a module for low voltage can be also used for high voltage such that a total capacity of high voltage power increases, whereby mileage and engine power can be enhanced.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a battery system for a vehicle will be described in detail with reference to the accompanying drawings.

Figure 1:
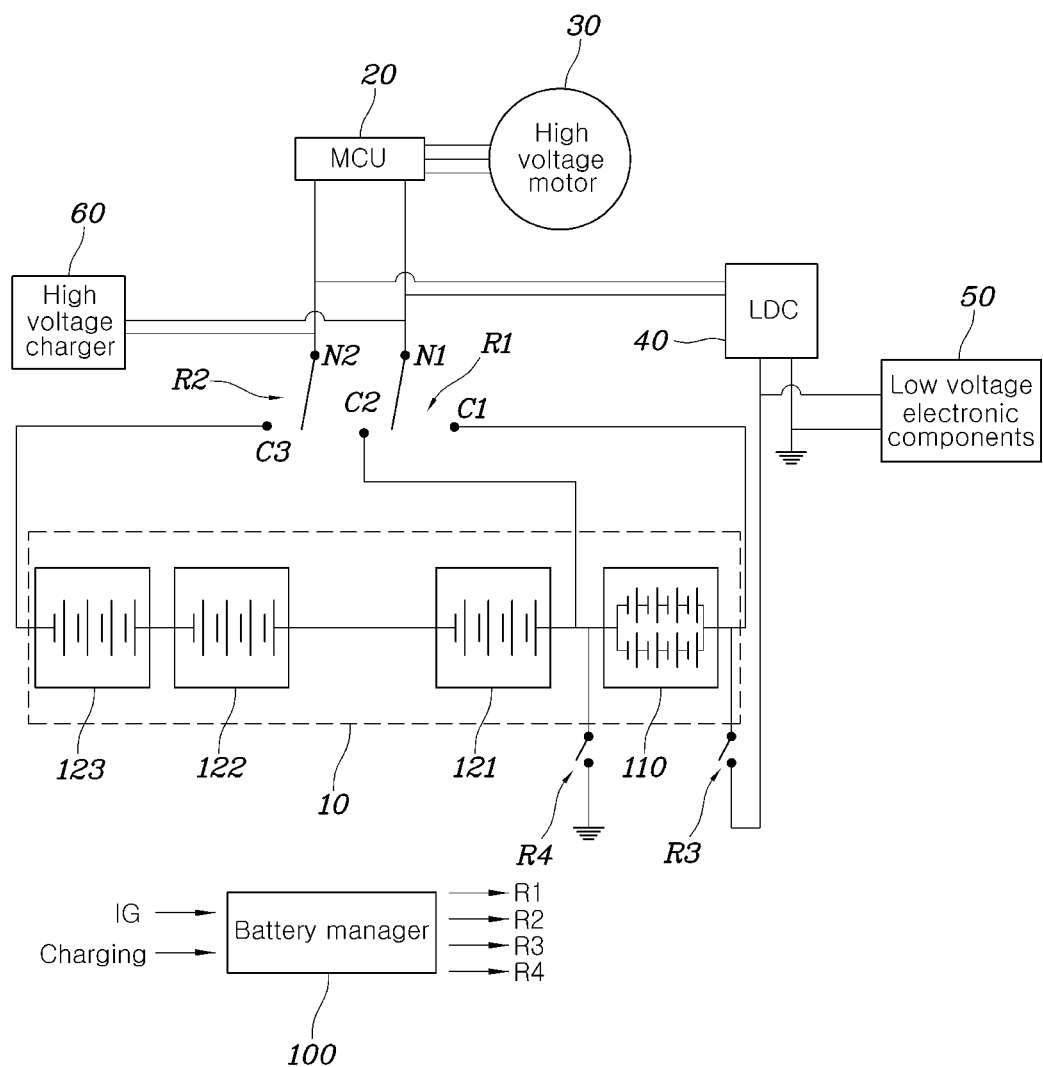
FIG. 1 is a configuration diagram illustrating a battery system for a vehicle according to an embodiment of the present disclosure.

FIG. 1 is a configuration diagram illustrating a battery system for a vehicle according to an embodiment of the present disclosure.

Referring to FIG. 1, a battery system for a vehicle according to an embodiment of the present disclosure may include: a battery assembly 10 having a plurality of battery modules 110 and 121 to 123, a plurality of relays R1 to R4, a converter 40, and a battery manager 100 controlling states of the relays R1 to R4 based on a state of the vehicle.

The battery assembly 10 may form one packaging unit including a plurality of battery modules 110 and 121 to 123 that are electrically connected to each other in series. That is, the battery assembly 10 is provided in a shape of a casing as being one structure in appearance, and the plurality of battery modules 110 and 121 to 123 are electrically connected to each other in series inside of the battery assembly 10.

The plurality of battery modules included in the battery assembly 10 may include a first battery module 110 and second battery modules 121 to 123. In FIG. 1, the first battery module 110 is shown as one battery module, but may be realized as a plurality thereof having the same capacity and being connected to each other in series. Also, in FIG. 1, the second battery modules 121 to 123 are shown as a plurality of battery modules, but may be realized as one battery module.

In particular, the first battery module 110 is a battery module of which an output voltage has a level equal to power of a low voltage electronic load of a vehicle, and is one of modules included in the battery assembly 10, but may serve as a low voltage battery. Accordingly, it is desirable that the first battery module 110 has a capacity larger than that of each of the second battery modules 121 to 123.

As used herein, the term "capacity" of a battery module may refer to maximum energy that can be stored in the battery module. That is, the capacity is preset when manufacturing each battery module, and may be determined based on the number of battery cells included therein. When a plurality of first battery modules is provided, it is desired that respective capacities are equal to each other. When a plurality of second battery modules is provided, it is desired that respective capacities are equal to each other.

A first end C1 of the first battery module 110 and a second end of the first battery module 110 are connected to a first end C2 of the second battery modules 121 to 123 and a second end C3 of the second battery modules 121 to 123. The first end C2 and the second end C3 may be electrically connected to a first node N1 and a second node N2 by a first relay R1 and a second relay R2 selectively. For convenience of explanation, the first end of the first battery module 110 is called a first contact point C1, the first end of the second battery modules 121 to 123 is called a second contact point C2, and the second end of the second battery modules 121 to 123 is called a third contact point C3.

The first relay R1 and the second relay R2 may provide or block an electrical connection between the first to third contact points C1 to C3 and the first and second nodes N1 and N2. The first relay R1 may be closed/opened between the first node N1 and one of the first contact point C1 and the second contact point C2. For example, according to control of the battery manager 100, the first relay R1 may connect the first node N1 to the first contact point C1, or may connect the first node N1 to the second contact point C2, or may not connect the first node N1 to any one of the first contact point C1 and the second contact point C2 to make the first node N1 to be in a floating state.

The second relay R2 may be closed/opened between the third contact point C3 and the second node N2. For example, according to control of the battery manager 100, the second relay R2 may connect the second node N2 to the third contact point C3, or may separate the second node N2 from the third contact point C3.

The first node N1 and the second node N2 may provide input and output ends of the battery system. That is, the first node N1 and the second node N2 may be connected to an input end of an inverter (or a motor control unit including an inverter) 20 that converts and provides battery power to a high voltage motor 30 enabling a vehicle to run. Also, the first node N1 and the second node N2 may be connected to an output end of a high voltage charger 60 that receives power from outside and converts it to power for battery charging. Also, the first node N1 and the second node N2 may be connected to an input end of a converter 40 that converts a high voltage to a low voltage to provide the lower voltage to a low voltage electronic component 50.

The converter 40 converts a high voltage received from the battery assembly 10 to a low voltage to provide the lower voltage to the low voltage electronic component 50 as power, or provide a charging voltage for the battery module 110 of a first group included in the battery assembly 10. The converter 40 is a converter that converts a direct current high voltage to a direct current low voltage, and may be called a low voltage DC-DC converter (LDC).

A third relay R3 and a fourth relay R4 are relays for determining an electrical connection state of two ends of the first group for realizing a low voltage battery. The third relay R3 may be closed/opened between an output end of the converter 40 and a first end of the first group, and the fourth relay R4 may be closed/opened between a second end of the first group (i.e., a connection end with a second group) and a ground.

The above-described overall operation of the battery system may be executed by the battery manager 100. The battery manager 100 can stably operate the high voltage-low voltage integrated system by controlling states of the first to fourth relays R1 to R4 based on energy storage amounts of the first battery module 110 and the second battery modules 121 to 123 and states of a vehicle, i.e., whether or not a vehicle is started, is running, is charged, etc.

Hereinafter, control operation of the battery manager 100, namely, operation of a battery system according to various embodiments of the present disclosure will be described with reference to FIGS. 2 to 5.

Figure 2:
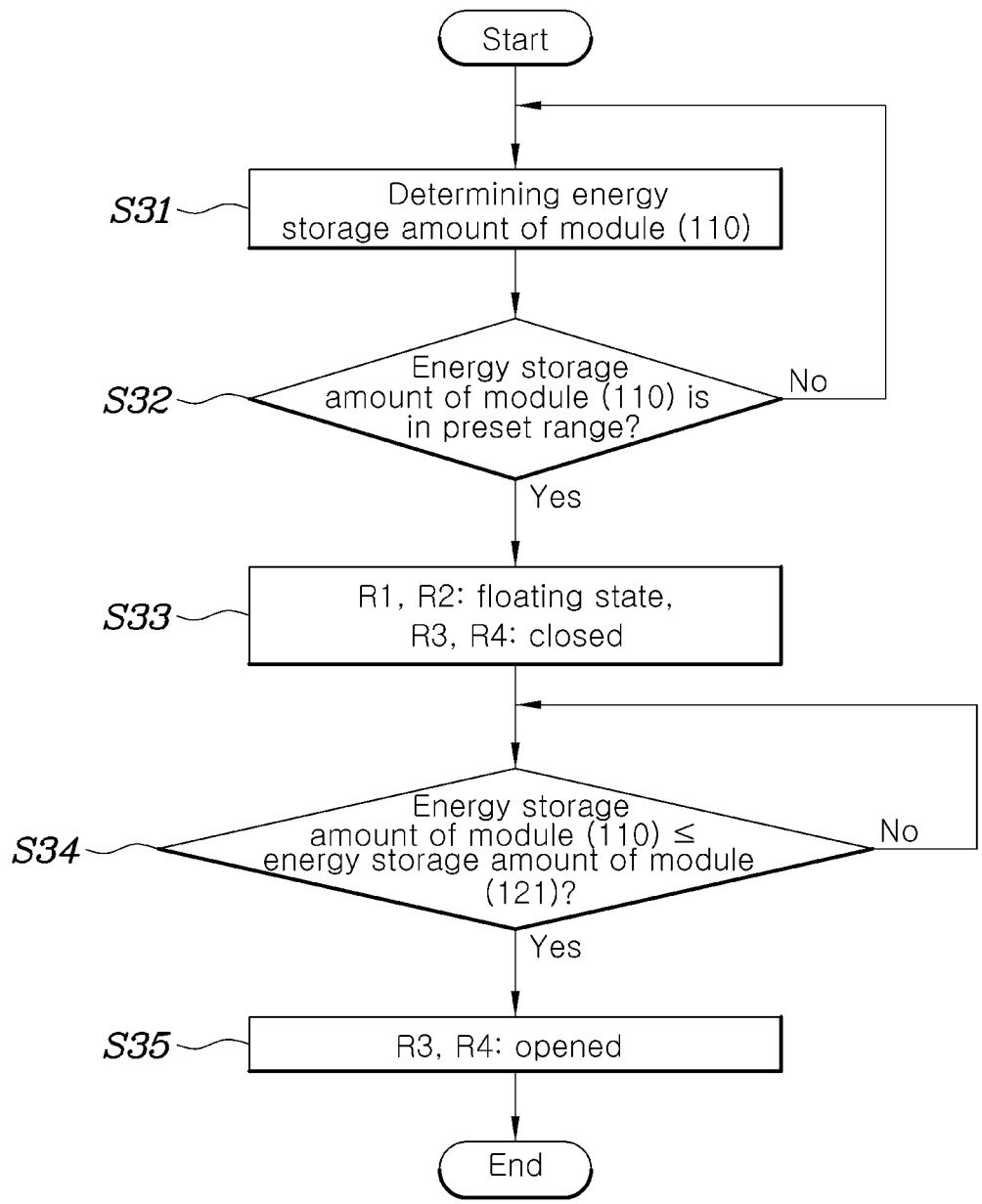
FIG. 2 is a flowchart illustrating operation of a battery system for a vehicle according to an embodiment of the present disclosure in a key-off state of the vehicle.
Figure 3:
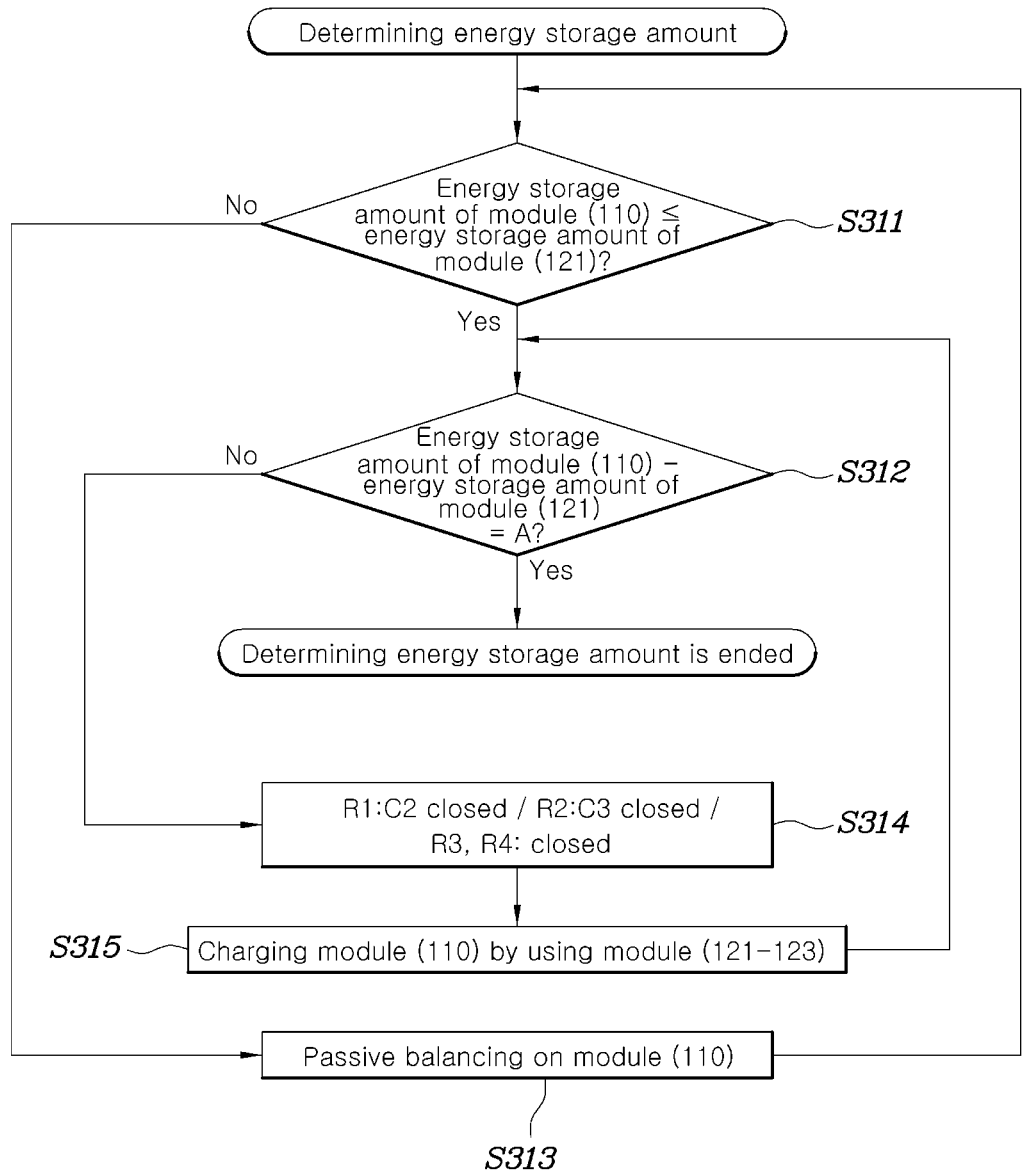
FIG. 3 is a flowchart illustrating in detail a process of determining an energy storage amount of a module of FIG. 2.

First, FIGS. 2 and 3 are flowcharts illustrating operation of a battery system for a vehicle according to an embodiment of the present disclosure in a key-off state of the vehicle.

In the embodiment of the present disclosure, in a case of a key-off state where running of the vehicle is terminated, the battery manager 100 determines an energy storage amount of the battery modules 110 and 121 to 123 at step S31. The determining at step S31 is a process of comparing an energy storage amount of the first battery module 110 with an energy storage amount of one (121 in FIGS. 2 to 5) of the second battery modules 121 to 123 and controlling a difference to be a preset reference value.

FIG. 3 is a flowchart illustrating in detail a process of determining an energy storage amount of a module of FIG. 2.

Referring to FIG. 3, when the determining of the energy storage amount of the module at step S31 is started, the battery manager 100 determines whether or not the energy storage amount of the first battery module 110 is equal to or less than the energy storage amount of the second battery module 121 at step S311.

When the energy storage amount of the first battery module 110 is equal to or less than the energy storage amount of the second battery module 121 at the determining at step S311, whether or not a value obtained by subtracting the energy storage amount of the second battery module 121 from the energy storage amount of first battery module 110 is equal to the preset reference value A is determined at step S312.

When the value obtained by subtracting the energy storage amount of the second battery module 121 from the energy storage amount of the first battery module 110 is equal to the preset reference value A, the determining of the energy storage amount is ended.

When the value obtained by subtracting the energy storage amount of the second battery module 121 from the energy storage amount of the first battery module 110 is different from the preset reference value A at step S312, namely, the value obtained by subtracting the energy storage amount of the second battery module 121 from the energy storage amount of the first battery module 110 is less than the preset reference value A, the battery manager 100 connects the first relay R1 to the first end C2 of the second battery modules 121 to 123, connects the second relay R2 to the second end C3 of the second battery modules 121 to 123, and closes the third and fourth relays R3 and R4 at step S314. Next, the battery manager 100 operates the converter to charge the first battery module 110 by using the energy stored in the second battery modules 121 to 123 at step S312. The charging of the first battery module 110 by using the energy stored in the second battery modules 121 to 123 proceeds until the value obtained by subtracting the energy storage amount of the second battery module 121 from the energy storage amount of the first battery module 110 reaches the preset reference value A.

In particular, the preset reference value A may be a value obtained by subtracting the capacity of the second battery module 121 from the capacity of the first battery module 110. That is, the first battery module 110 included in the battery assembly 10 is operated as a high voltage battery with the second battery modules 121 to 123, and is also operated as a low voltage battery for low voltage electronic loads by itself. Thus, the first battery module 110 has a capacity larger than that of each of second battery modules 121 to 123. The reference value may be determined based on that it is desirable that a capacity difference between two battery modules in an initial state (a manufacturing state of a battery module) is maintained during operating a battery.

In the meantime, when the energy storage amount of the first battery module 110 is not equal to or not less than the energy storage amount of the second battery module 121 at step S311, namely, the energy storage amount of the first battery module 110 exceeds the energy storage amount of the second battery module 121, the energy stored in the first battery module 110 is consumed at step S313. In the embodiment of the present disclosure, the battery manager 100 can discharge the first battery module 110 by performing passive balancing thereon in order to consume the energy stored in the first battery module 110.

After performing the consuming of the energy stored in the first battery module 110 at step S313, the battery manager 100 repeats the determining steps S311 and S312. Consequently, a difference between the energy stored in the first battery module 110 and the energy stored in the second battery module 121 reaches the reference value A.

Referring to FIG. 2 again, when the determining of the energy storage amount at step S31 is ended, the battery manager 100 controls the first relay R1 and the second relay R2 not to be in contact with particular ends so as to make the first node N1 and the second node N2 to be in floating state, and closes the third relay R3 and the fourth relay R4 to provide an electrical connection between the first battery module 110 and the low voltage electronic component 50 at step S33. That is, through the above-described series of processes, the energy storage amount of the first battery module 110 operating as a low voltage battery is controlled to the optimum state by the determining of the energy storage amount at step S31, and then the first battery module is operated as a power source for the low voltage electronic component 50.

Before the controlling of the relays R1 to R4 at step S33, whether or not the energy amount stored in the first battery module 110 is in a preset range may be determined at step S32 to confirm whether the determining of the energy storage amount S31 is properly performed.

After the providing of an electrical connection between the first battery module 110 and the low voltage electronic component 50 at step S33, the battery manager 100 monitors the energy storage amount of the first battery module 110. When the energy storage amount of the first battery module 110 is equal to or less than a preset threshold value, the battery manager 100 opens the third and fourth relays R3 and R4 to avoid additional discharging of the first battery module 110. In particular, the preset threshold value may be the energy storage amount of the second battery module 121.

Figure 4:
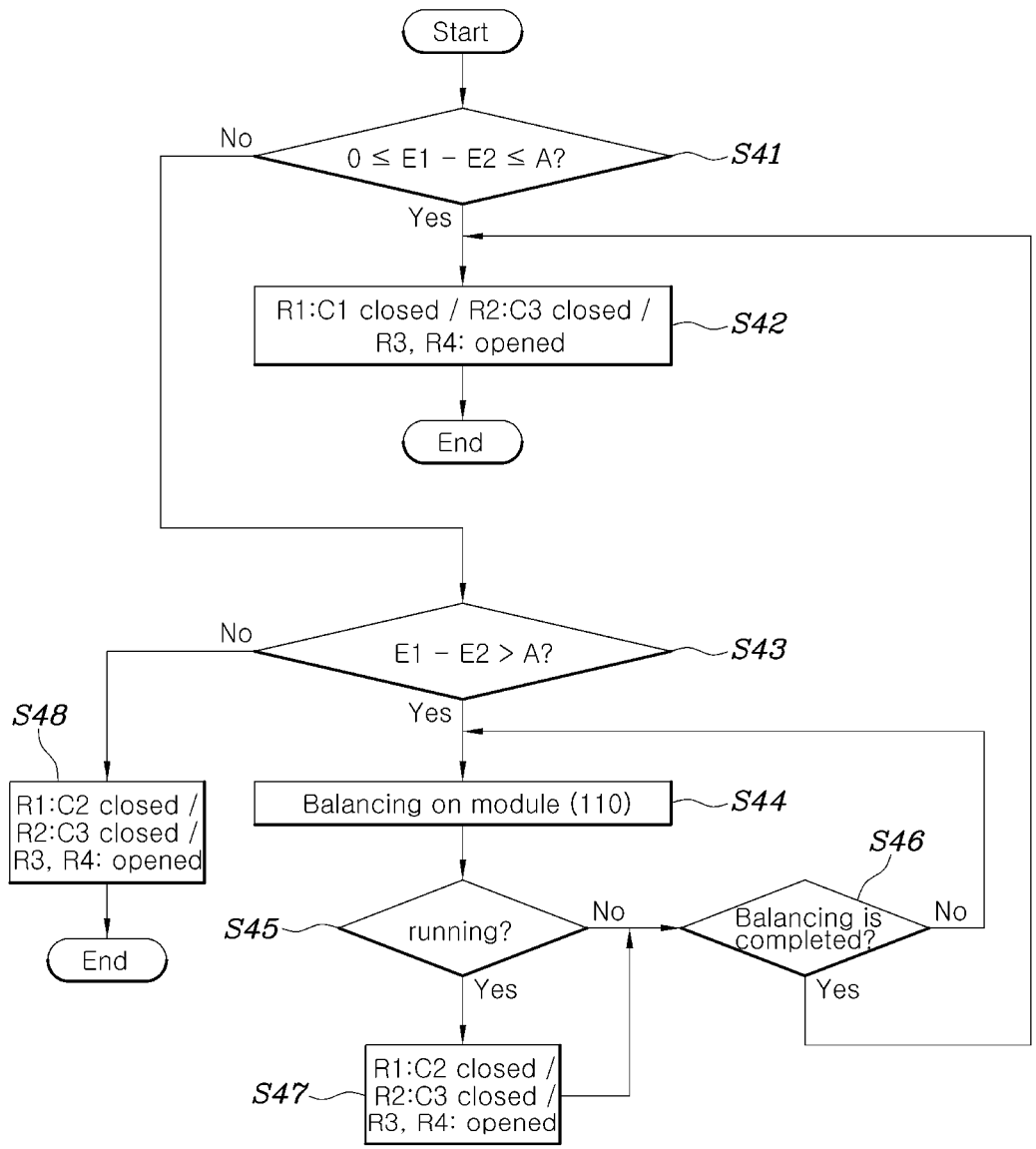
FIG. 4 is a flowchart illustrating operation of a battery system for a vehicle according to an embodiment of the present disclosure in an ignition-on (IG ON) state of the vehicle.

FIG. 4 is a flowchart illustrating operation of a battery system for a vehicle according to an embodiment of the present disclosure in an ignition-on (IG ON) state of the vehicle.

Referring to FIG. 4, when starting the vehicle (IG ON), the battery manager 100 may determine whether or not the value obtained by subtracting the energy storage amount of the second battery module 121 from the energy storage amount of the first battery module 110 is in a range that is equal to or greater than zero and is equal to or less than the preset reference value A at step S41.

In the embodiment of the present disclosure, an energy storage amount of a battery module is controlled so as to keep the value obtained by subtracting the energy storage amount of the second battery module 121 from the energy storage amount of the first battery module 110 in the range that is equal to or greater than zero and is equal to or less than the preset reference value A. That is, when a capacity of the first battery module 110 is larger than a capacity of the second battery module 121 during driving, the first and second battery modules 110 and 121 to 123 maintain a state where the maximum energy can be provided through regenerative braking. As described above, the reference value A may be a value obtained by subtracting a capacity of the second battery module 121 from a capacity of the first battery module 110.

When the value obtained by subtracting the energy storage amount of the second battery module 121 from the energy storage amount of the first battery module 110 is in the range that is equal to or greater than zero and is equal to or less than the preset reference value A, the battery manager 100 controls the first relay R1 to connect the first node N1 to the first end of the first battery module 110, controls the second relay R2 to connect the second node N2 to the second end of the second battery module 123, and controls the third and fourth relays R3 and R4 to be opened, whereby the battery assembly 10 can serve as a power source for the driving motor 30 of the vehicle at step S42.

After ignition-on of the vehicle, when the value obtained by subtracting the energy storage amount of the second battery module 121 from the energy storage amount of the first battery module 110 exceeds the preset reference value A at step S43, the battery manager 100 may discharge the first battery module 110 to make the energy storage amount of the first battery module 110 to be the preset value at step S44. For example, the battery manager 100 can discharge the first battery module 110 by performing passive balancing thereon at step S44.

When the vehicle is running during discharging of the first battery module 110, the battery manager 100 controls the first relay R1 to connect the first node N1 to the first end of the second battery module 121 and controls the second relay R2 to connect the second node N2 to the second end of the second battery module 123 at step S47 until the first battery module 110 is discharged to the reference value A. That is, when the energy storage amount of the first battery module 110 is discharged to the reference value A, the battery manager 100 can provide the energy stored in the second battery modules 121 to 123, except for the first battery module 110, to the driving motor of the vehicle. When discharging of the first battery module 110 is ended at step S46, the battery manager 100 controls the first relay R1 to connect the first node N1 to the first end of the first battery module 110, controls the second relay R2 to connect the second node N2 to the second end of the second battery module 123, and controls the third and fourth relays R3 and R4 to be opened, whereby the battery assembly 10 can serve as a power source for the driving motor 30 of the vehicle at step S42.

After ignition-on of the vehicle, when the value obtained by subtracting the energy storage amount of the second battery module 121 from the energy storage amount of the first battery module 110 is less than zero, it indicates that the energy storage amount of the first battery module 110 is insufficient and thus the first battery module 110 is unable to serve as a part of a high voltage battery. That is, after ignition-on of the vehicle, when the value obtained by subtracting the energy storage amount of the second battery module 121 from the energy storage amount of the first battery module 110 is less than zero, the battery manager 100 controls the first relay R1 to connect the first node N1 to the first end of the second battery module 121 and controls the second relay R2 to connect the second node N2 to the second end of the second battery module 123 at step S48 until the first battery module 110 is discharged to the reference value A.

After ignition-on of the vehicle, the battery manager 100 may control the state of charge (SOC) of the battery assembly 100 based on a battery module being used to supply power to the driving motor 30. For example, when the battery manager 100 controls the first relay R1 to connect the first node N1 to the first end of the first battery module 110 and controls the second relay R2 to connect the second node N2 to the second end of the second battery module 123 such that the battery assembly 10 is operated as a power source for the driving motor 30 of the vehicle, the battery manager 100 may control the state of charge of the battery based on both the first and second battery modules 110 and 121 to 123 at step S42. When the battery manager 100 controls the first relay R1 to connect the first node N1 to the first end of the second battery module 121 and controls the second relay R2 to connect the second node N2 to the second end of the second battery module 123 such that only the second battery modules 121 to 123 are operated as a power source for the driving motor 30, the battery manager 100 may control the state of charge of the battery based on only the second battery modules 121 to 123 except for the first battery module 110.

Figure 5:
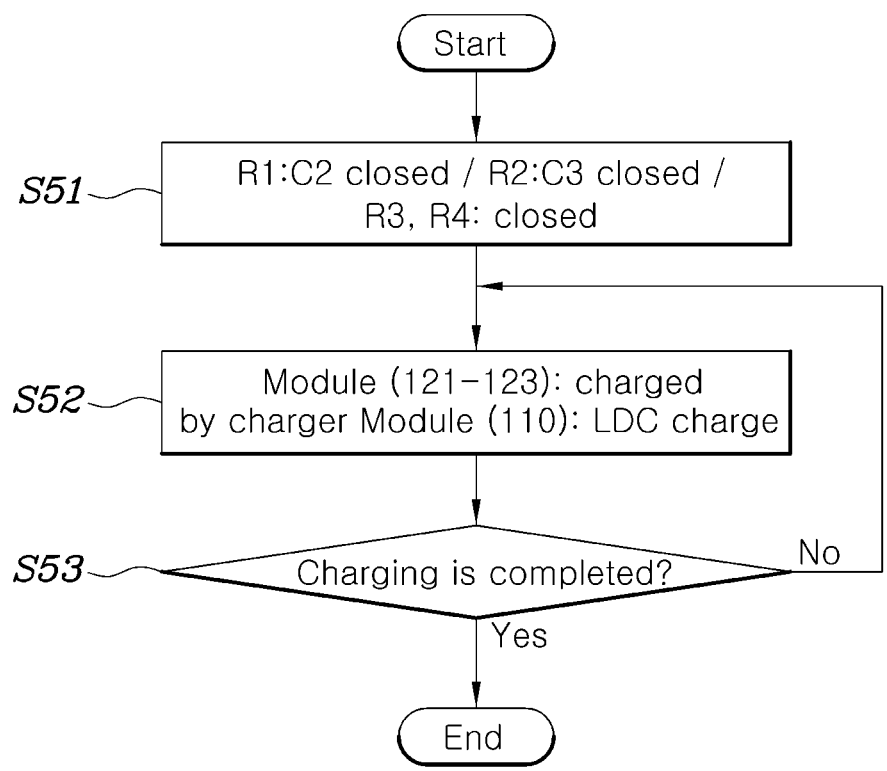
FIG. 5 is a flowchart illustrating operation of a battery system for a vehicle according to an embodiment of the present disclosure in a state of charge of the vehicle.

FIG. 5 is a flowchart illustrating operation of a battery system for a vehicle according to an embodiment of the present disclosure in a state of charge of the vehicle.

Referring to FIG. 5, when charging power from the outside is supplied to the first node N1 and the second node N2 through the charger 60, the battery manager 100 controls the first relay R1 to connect the first node N1 and the first end of the second battery module 121, controls the second relay R2 to connect the second node N2 to the second end of the second battery module 123, and controls the third and fourth relays R3 and R4 to be closed at step S51. In particular, the converter 40 is operated, and the converter 40 converts the energy stored in the second battery modules 121 to 123 to a low voltage to provide the low voltage to the first battery module 110, whereby the first battery module 110 is charged at step S52.

When each state of charge reaches a set value (e.g., 100%), charging is completed at step S53.

After charging is completed, the relays R1 to R4 may be controlled based on states of the vehicle as shown in FIGS. 2 to 4.

Figure 6:
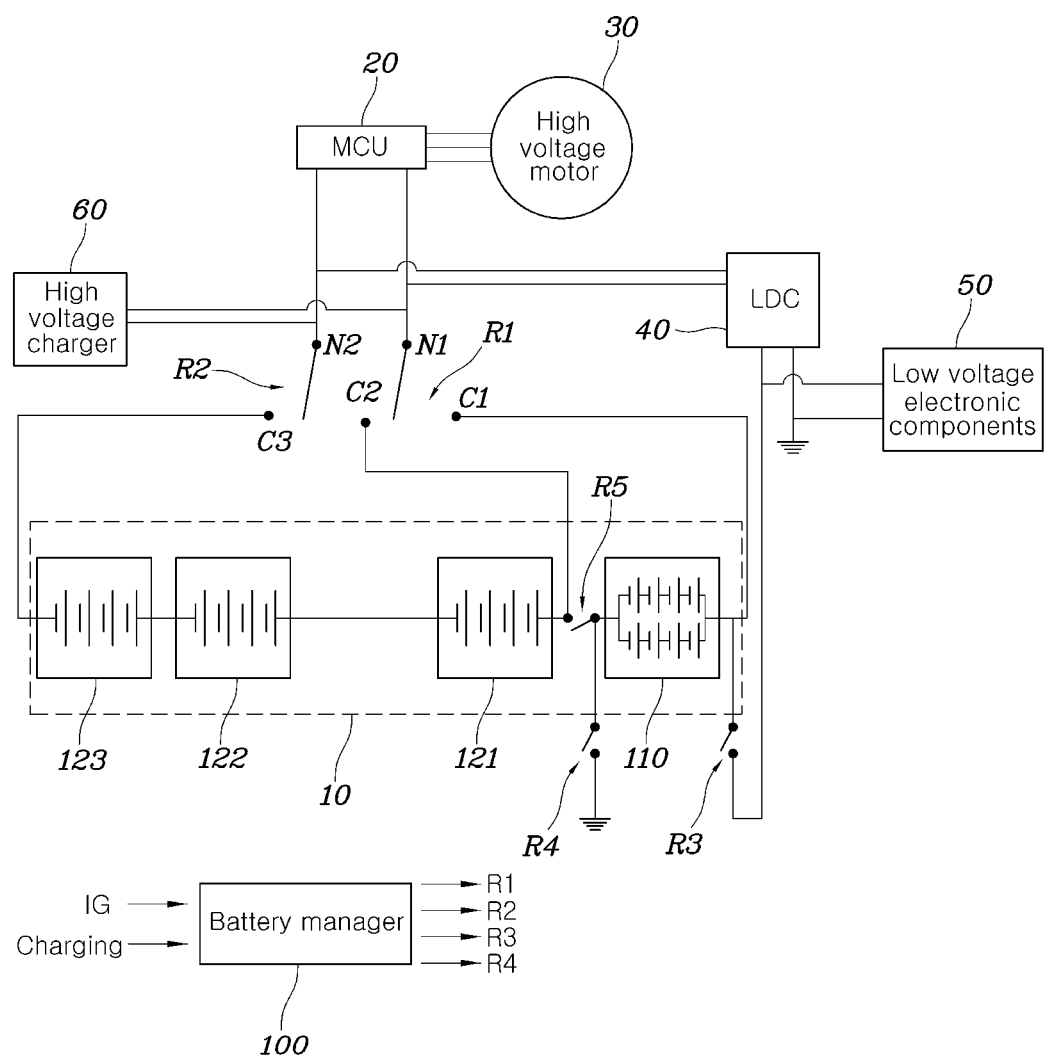
FIGS. 6 and 7 are configuration diagrams illustrating a battery system for a vehicle according to various embodiments of the present disclosure.
Figure 7:
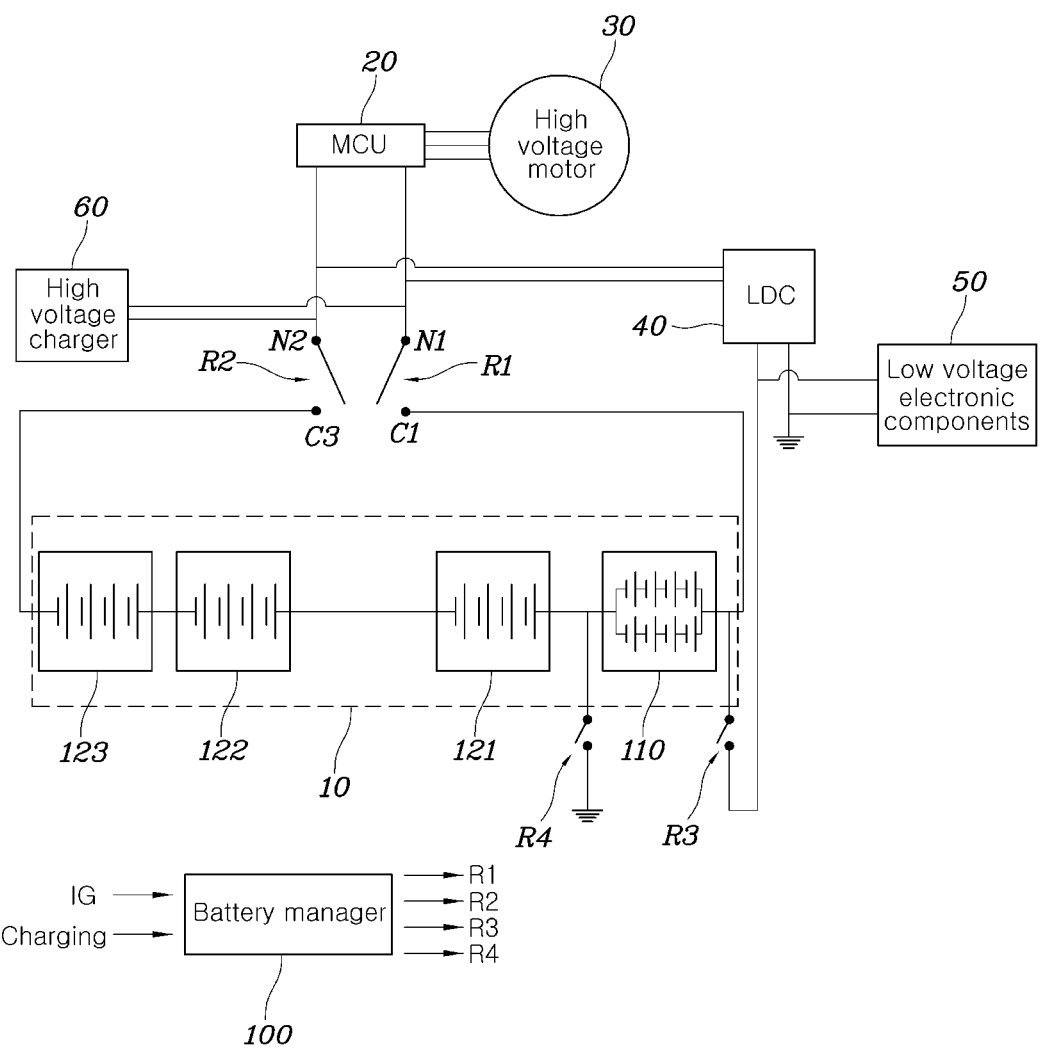

FIGS. 6 and 7 are configuration diagrams illustrating a battery system for a vehicle according to various embodiments of the present disclosure.

The embodiment shown in FIG. 6 is a configuration in which a relay R5 between the first battery module 110 and the second battery module 121 is added to the embodiment shown in FIG. 1. When the first relay R1 is connected to the first end of the second battery module 121 and the second relay R2 is connected to the second end of the second battery module 123, the relay R5 may block an electrical connection between the first battery module 110 and the second battery modules 121 to 123. Particularly, when the third and fourth relays R3 and R4 are closed to charge the first battery module 110 by using the energy stored in the second battery modules 121 to 123, the battery manager 100 may control the relay R5 to be opened. The relay R5 is provided to prevent dielectric breakdown between a high voltage loop and a low voltage loop.

The embodiment shown in FIG. 7 is a configuration in which the second contact point C2, which is the first end of the second battery module 121, is removed from the embodiment shown in FIG. 1. In the embodiment of FIG. 7, an electrical closing/opening between the first end C1 of the first battery module 110 and the first node N1 may be determined by the first relay R1, and an electrical closing/opening between the second end C3 of the second battery module 123 and the second node N2 may be determined by the second relay R2.

In the embodiment shown in FIG. 7, the first relay R1 being controlled to be connected to the first contact point C1 may be substituted for the first relay R1 being controlled to be connected to the second contact point C2 in the embodiment shown in FIG. 1. For example, at step S314 in FIG. 3, at steps S47 and S48 in FIG. 4, and at step S51 in FIG. 5, first relay R1 may be controlled to be connected to the first end C1 of the first battery module 110.

As described above, in the battery system for the vehicle according to various embodiments of the present disclosure, parts of several battery modules that make up one battery assembly used in a high voltage system of the vehicle are used for a low voltage system. Also, a capacity of the battery module used for low voltage is significantly larger than a capacity of each of the remaining battery modules, and a battery module used for high-voltage power is determined based on a driving state of a vehicle and a deviation of energy storage amounts between the low voltage battery module and the remaining battery modules, whereby it is possible to solve problems such as balancing required to use some modules of the battery assembly for low voltage.

Also, in the battery system for the vehicle according to various embodiments of the present disclosure, a separate low voltage battery is unnecessary such that a space required thereby in the vehicle is unnecessary, whereby it is easy to manufacture the battery system and manufacturing costs can be reduced.

Also, in the battery system for the vehicle according to various embodiments of the present disclosure, a module for low voltage can be also used for high voltage such that a total capacity of high voltage power increases, whereby mileage and engine power can be enhanced.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A battery system for a vehicle, the system comprising:
   a battery assembly including at least one first battery module and at least one second battery module that are connected to each other in series;
   a first relay being closed/opened between a first node and one of a first end of the first battery module, and a first end of the second battery module being connected to a second end of the first battery module;
   a second relay being closed/opened between a second node and a second end of the second battery module;
   a converter converting a voltage between the first node and the second node to output the converted voltage;
   a third relay being closed/opened between an output end of the converter and the first end of the first battery module;
   a fourth relay being closed/opened between the first end of the first battery module and a ground; and
   a battery manager controlling the first to fourth relays based on a driving condition of the vehicle and energy storage amounts of the first battery module and the second battery module.

2. The system of claim 1, wherein the first and second nodes are connected to an input end of an inverter converting direct current power to alternating current power of the battery assembly to provide the alternating current power to a driving motor of the vehicle.

3. The system of claim 1, wherein the first and second nodes receive charging power for charging the first battery module and the second battery module.

4. The system of claim 1, wherein the output end of the converter is connected to a power input end of an electronic component of the vehicle.

5. The system of claim 1, wherein a capacity of the first battery module is larger than a capacity of the second battery module.

6. The system of claim 5, wherein in a case of a key-off state of the vehicle, when a value obtained by subtracting the energy storage amount of the second battery module from the energy storage amount of the first battery module is less than zero, the battery manager controls the first relay to connect the first node to the first end of the second battery module, controls the second relay to connect the second node to the second end of the second battery module, and controls the third and fourth relays to be closed, and the battery manager operates the converter to charge the first battery module by using energy stored in the second battery module such that the energy storage amount of the first battery module reaches a preset reference value.

7. The system of claim 6, wherein the preset reference value is a value obtained by subtracting the capacity of the second battery module from the capacity of the first battery module.

8. The system of claim 5, wherein in a case of a key-off state of the vehicle, when a value obtained by subtracting the energy storage amount of the second battery module from the energy storage amount of the first battery module exceeds a preset reference value, the battery manager discharges the first battery module such that the energy storage amount of the first battery module reaches the preset reference value.

9. The system of claim 8, wherein the battery manager discharges the first battery module by performing passive balancing thereon such that the energy storage amount of the first battery module reaches the preset reference value.

10. The system of claim 5, wherein in a case of a key-off state of the vehicle, when a value obtained by subtracting the energy storage amount of the second battery module from the energy storage amount of the first battery module is equal to a preset reference value, the battery manager controls the first and second relays such that the first and second nodes are in a floating state, and controls the third and fourth relays to be closed, and
   after the controlling the third and fourth relays to be closed, when the energy storage amount of the first battery module is equal to or less than a preset threshold value, the battery manager controls the third and fourth relays to be opened.

11. The system of claim 5, wherein after ignition-on of the vehicle, when a value obtained by subtracting the energy storage amount of the second battery module from the energy storage amount of the first battery module is equal to or greater than zero and is equal to or less than a preset reference value, the battery manager controls the first relay to connect the first node to the first end of the first battery module, controls the second relay to connect the second node to the second end of the second battery module, and controls the third and fourth relays to be opened.

12. The system of claim 5, wherein after ignition-on of the vehicle, when a value obtained by subtracting the energy storage amount of the second battery module from the energy storage amount of the first battery module exceeds a preset reference value, the battery manager discharges the first battery module such that the energy storage amount of the first battery module reaches the preset reference value.

13. The system of claim 12, wherein the battery manager discharges the first battery module by performing passive balancing thereon such that the energy storage amount of the first battery module reaches the preset reference value.

14. The system of claim 12, wherein when the vehicle is running during discharging of the first battery module, the battery manager controls the first relay to connect the first node to the first end of the second battery module and controls the second relay to connect the second node to the second end of the second battery module until the first battery module is discharged to the preset reference value, whereby energy stored in the second battery module is provided to a driving motor of the vehicle.

15. The system of claim 5, wherein after ignition-on of the vehicle, when a value obtained by subtracting the energy storage amount of the second battery module from the energy storage amount of the first battery module is less than zero, the battery manager controls the first relay to connect the first node to the first end of the second battery module and controls the second relay to connect the second node to the second end of the second battery module, whereby energy stored in the second battery module is provided to a driving motor of the vehicle.

16. The system of claim 5, wherein when charging power is supplied from outside through the first node and the second node, the battery manager controls the first relay to connect the first node to the first end of the second battery module, controls the second relay to connect the second node to the second end of the second battery module, and controls the third and fourth relays to be closed, and the battery manager operates the converter to charge the first battery module by using energy stored in the second battery module.

17. The system of claim 1, further comprising:
a fifth relay being closed/opened between the second end of the first battery module and the first end of the second battery module,
wherein when the first relay is closed between the first node and the first end of the first battery module, the battery manager closes the fifth relay, and
when the second relay is closed between the second node and the first end of the second battery module or the second node is in floating state, the battery manager opens the fifth relay.

18. A battery system for a vehicle, the system comprising:
a battery assembly including at least one first battery module and at least one second battery module that have different capacities from each other;
an input/output end to which energy of the first battery module or energy that is a sum of the energy of the first battery module and energy of the second battery module is selectively applied;
a converter converting a voltage of energy of the battery assembly being applied to the input/output end and selectively providing the converted voltage to the first battery module; and
a battery manager determining an electrical connection between the battery assembly and the input/output end and an electrical connection between the converter and the first battery module based on a driving condition of the vehicle and energy storage amounts of the first battery module and the second battery module.

19. The system of claim 18, wherein the battery manager determines the electrical connection between the battery assembly and the input/output end and the electrical connection between the converter and the first battery module such that a value obtained by subtracting the energy storage amount of the second battery module from the energy storage amount of the first battery module is in a preset reference range.

20. A battery system for a vehicle, the system comprising:
a battery assembly including at least one first battery module and at least one second battery module that are connected to each other in series;
a first relay being closed/opened between a first end of the battery assembly and a first node;
a second relay being closed/opened between a second end of the battery assembly and a second node;
a converter converting a voltage between the first node and the second node to output the converted voltage;
a third relay being closed/opened between an output end of the converter and a first end of the first battery module;
a fourth relay being closed/opened between the first end of the first battery module and a ground; and
a battery manager controlling the first to fourth relays based on a driving condition of the vehicle and energy storage amounts of the first battery module and the second battery module.

21. The system of claim 20, wherein a capacity of the first battery module is larger than a capacity of the second battery module.

22. The system of claim 21, wherein in a case of a key-off state of the vehicle, when a value obtained by subtracting the energy storage amount of the second battery module from the energy storage amount of the first battery module is less than zero, the battery manager controls the first to fourth relays to be closed, and operates the converter to charge the first battery module by using energy stored in the battery assembly such that the energy storage amount of the first battery module reaches a preset reference value.

23. The system of claim 22, wherein the preset reference value is a value obtained by subtracting the capacity of the second battery module from the capacity of the first battery module.

24. The system of claim 21, wherein in a case of a key-off state of the vehicle, when a value obtained by subtracting the energy storage amount of the second battery module from the energy storage amount of the first battery module exceeds a preset reference value, the battery manager discharges the first battery module by performing passive balancing thereon such that the energy storage amount of the first battery module reaches the preset reference value.

25. The system of claim 21, wherein in a case of a key-off state of the vehicle, when a value obtained by subtracting the energy storage amount of the second battery module from the energy storage amount of the first battery module is equal to a preset reference value, the battery manager controls the first and second relays to be opened and controls the third and fourth relays to be closed, and
after the controlling the third and fourth relays to be closed, when the energy storage amount of the first battery module is equal to or less than a preset threshold value, the battery manager controls the third and fourth relays to be opened.

26. The system of claim 21, wherein after ignition-on of the vehicle, when a value obtained by subtracting the energy storage amount of the second battery module from the energy storage amount of the first battery module is equal to or greater than zero and is equal to or less than a preset reference value, the battery manager controls the first and second relays to be closed and controls the third and fourth relays to be opened.

27. The system of claim 21, wherein after ignition-on of the vehicle, when a value obtained by subtracting the energy storage amount of the second battery module from the energy storage amount of the first battery module exceeds a preset reference value, the battery manager discharges the first battery module by performing passive balancing thereon such that the energy storage amount of the first battery module reaches the preset reference value.

28. The system of claim 21, wherein when charging power is supplied from outside through the first node and the second node, the battery manager controls the first to fourth relays to be closed, and operates the converter to charge the first battery module by using energy stored in the battery assembly.

* * * * *